US010664566B2

(12) United States Patent
Krishnamurthy et al.

(10) Patent No.: US 10,664,566 B2
(45) Date of Patent: *May 26, 2020

(54) BANDWIDTH TEST IN NETWORKING SYSTEM-ON-CHIP VERIFICATION

(71) Applicant: Mentor Graphics Corporation, Wilsonville, OR (US)

(72) Inventors: Suresh Krishnamurthy, Noida (IN); Deepak Kumar Garg, Noida (IN); Saurabh Khaitan, Noida (IN); Sanjay Gupta, Noida (IN); John R. Stickley, Lake Oswego, OR (US); Russell Elias Vreeland, III, Seal Beach, CA (US); Ronald James Squiers, Castro Valley, CA (US); Charles W. Selvidge, Oakland, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/792,139

(22) Filed: Oct. 24, 2017

(65) Prior Publication Data

US 2018/0113961 A1 Apr. 26, 2018

Related U.S. Application Data

(60) Provisional application No. 62/412,803, filed on Oct. 25, 2016.

(51) Int. Cl.
*G06F 17/50* (2006.01)
*G06F 13/16* (2006.01)
(Continued)

(52) U.S. Cl.
CPC ........ *G06F 17/5077* (2013.01); *G06F 11/221* (2013.01); *G06F 11/2221* (2013.01);
(Continued)

(58) Field of Classification Search
USPC ........................................................ 716/136
See application file for complete search history.

(56) References Cited

U.S. PATENT DOCUMENTS 7,502,884 B1 3/2009 Shah et al.
9,397,944 B1 7/2016 Hobbs et al.
(Continued)

OTHER PUBLICATIONS

Naruko et al., "FOLCS: A Lightweight Implementation of a Cycle-accurate NoC Simulator on FPGAs", 3rd International Workshop on Many-core Embedded Systems, Jun. 2015, 8 pgs.
(Continued)

*Primary Examiner* — Mohammed Alam

(57) ABSTRACT

Aspects of the disclosed technology relate to techniques of bandwidth test in networking system-on-chip design verification. A hardware model of interface circuitry implemented in a reconfigurable hardware modeling device associates dispatch time information with messages when the messages are dispatched by a hardware model of a circuit design implemented in the reconfigurable hardware modeling device. The dispatch time information of a particular message includes information about when, based on a model time reference provided in the reconfigurable hardware modeling device, the particular message is dispatched by the hardware model of the circuit design. The messages and the dispatch time information are sent to a traffic analysis device, which determines bandwidth information of ports of the circuit design based on the dispatch time information.

27 Claims, 7 Drawing Sheets

Flow chart 505

(51) Int. Cl.
*G06F 11/22* (2006.01)
*G06F 11/273* (2006.01)
*G06F 11/26* (2006.01)

(52) U.S. Cl.
CPC ........ *G06F 11/2289* (2013.01); *G06F 11/261* (2013.01); *G06F 11/2733* (2013.01); *G06F 13/1673* (2013.01); *G06F 17/504* (2013.01); *G06F 17/5027* (2013.01); *G06F 17/5031* (2013.01); *G06F 17/5054* (2013.01); *G06F 17/5068* (2013.01); *G06F 17/5081* (2013.01)

(56) References Cited

U.S. PATENT DOCUMENTS

| | | | |
|---|---|---|---|
| 2004/0111248 | A1 | 6/2004 | Granny et al. |
| 2005/0022143 | A1 | 1/2005 | Butts et al. |
| 2005/0175341 | A1 | 8/2005 | Ovadia |
| 2011/0072151 | A1 | 3/2011 | Sharma et al. |
| 2015/0073609 | A1* | 3/2015 | Forbes, Jr. ............... G05F 1/66 700/286 |
| 2015/0188847 | A1 | 7/2015 | Chopra et al. |
| 2015/0215177 | A1 | 7/2015 | Pietrowicz et al. |
| 2016/0234119 | A1 | 8/2016 | Zaidi et al. |
| 2017/0193136 | A1 | 7/2017 | Prasad et al. |
| 2018/0113970 | A1 | 4/2018 | Suresh et al. |
| 2018/0113972 | A1* | 4/2018 | Suresh ............... G06F 13/1673 |
| 2018/0113976 | A1* | 4/2018 | Suresh ............... G06F 13/1673 |
| 2018/0300440 | A1* | 10/2018 | Ali ..................... G06F 17/5045 |

OTHER PUBLICATIONS

Chen et al., "Pipelined NoC Router Architecture Design with Buffer Configuration Exploration on FPGA", 25th International Conference on Field Programmable Logic and Applications, Sep. 2015, 4 pgs.

* cited by examiner

Flow chart 500

BANDWIDTH TEST IN NETWORKING SYSTEM-ON-CHIP VERIFICATION

RELATED APPLICATIONS

This application claims the benefit of U.S. Provisional Patent Application No. 62/412,803, filed on Oct. 25, 2016, and naming Krishnamurthy Suresh et al. as inventors, which application is incorporated entirely herein by reference.

FIELD OF THE DISCLOSED TECHNOLOGY

The present disclosed technology relates to the field of circuit design verification technology. Various implementations of the disclosed technology may be particularly useful for verifying networking system-on-chip circuit designs.

BACKGROUND OF THE DISCLOSED TECHNOLOGY

Modern integrated circuit designs have become extremely complex. As a result, various techniques have been developed to verify that circuit designs will operate as desired before they are implemented in an expensive manufacturing process. For example, logic simulation is a tool used for verifying the logical correctness of a hardware design. Designing hardware today involves writing a program in the hardware description language. A simulation may be performed by running that program. If the program runs correctly, then one can be reasonably assured that the logic of the design is correct at least for the cases tested in the simulation.

Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel as the circuit design will execute in a real device. By contrast, a simulator performs circuit verification by executing the hardware description code serially. The different styles of execution can lead to orders of magnitude differences in execution time.

While reconfigurable hardware modeling device-based emulation and prototyping are much faster than simulation for system-on-chip designs, verifying circuit designs for networking applications at the system level remains a challenge. These designs can reach billion-gate sizes and are complex in various dimensions, imposing a variety of requirements on the verification environment.

A network switch, for example, receives traffic from its ingress pin interfaces and after some traffic arbitration, flow control and routing, sends it out through its egress pin interfaces. These ingress and egress pin interfaces are also known as ports. The port interfaces follow the network protocol in both directions. Hence the verification components that drive traffic into the ports and receive traffic from the ports have to be protocol compliant. A modern-day Ethernet switch can have a large number of such ingress/egress ports (e.g., from 64 to 256). The number is expected to grow up to 1024 in the coming future. All port configurations need to be tested; and the performance and bandwidth of the network switch design need to be checked and measured.

A verification system typically includes a reconfigurable hardware modeling device programmed to implement at least a hardware model of the networking circuit design under test, a traffic generation device configurable to generate traffic mimicking the complexities of real life networking traffic, and a traffic analysis device configurable to qualify and measure a variety of different parameters important for the verification. The traffic generation device may be able to create multiple streams of traffic and then combine them in a desired proportion or scheme to be sent to a given port on the switch design. The packets in a stream may be given different priorities as per the protocol.

The traffic generation device and the traffic analysis device may be implemented by a complex software tool running on a computer. This complex software tool can generate message packets at a speed much faster than the speed at which the hardware model implemented on a reconfigurable hardware modeling device can process message packets. This is at least in part because the traffic generation is a software algorithm operating at a high level of abstraction whereas the hardware model runs the switch design at a low, RTL level of abstraction.

The speed mismatch can complicate verifying performance of a circuit design for a networking device. Latency and bandwidth are two important performance characteristics, defining the speed and capacity of a networking device, respectively. Latency represents a delay for relaying a message, which can be caused by limited processing speed and queuing of the networking device; and bandwidth represents maximum throughput or the amount of data that can be transferred during a second. A good networking device typically is able to deliver high bandwidth and low latency. Determination of these two time-related performance components of a modeled circuit design is thus important for design verification. Different operating speeds, however, makes it difficult for the traffic analysis device to perform it.

A mere replacement of wall-clock time with model time provided in the reconfigurable hardware modeling device as a global time reference cannot solve the problem. The traffic generation device typically runs ahead of the modeled circuit design and thus at any point of time it would have already generated messages to be consumed by the modeled circuit design at a future model time. The situation is reversed for the traffic analysis device, which typically analyzes packets sent out in the past w.r.t. the current model time. Moreover, because of message buffering between the traffic generation/analysis device and the reconfigurable hardware modeling device for flow control, finding a global time reference does not appear to be a viable solution to the speed mismatch problem associated with the latency and bandwidth analysis.

BRIEF SUMMARY OF THE DISCLOSED TECHNOLOGY

Aspects of the disclosed technology relate to techniques of bandwidth test in networking system-on-chip design verification. In one aspect, there is a method comprising: associating, by a hardware model of interface circuitry implemented in a reconfigurable hardware modeling device, dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design; and sending the messages and the dispatch time information to a traffic analysis device.

The model time reference may be provided at least in part by a multi-bit register in the reconfigurable hardware modeling device. The associating dispatch time information with messages may comprise: inserting the dispatch time information of each of the messages in a metadata field of or a data field of the each of the messages or in special messages.

The method may further comprise: associating, by the hardware model of the interface circuitry, arrival time information with the messages when the messages are delivered to the hardware model of the circuit design, the arrival time information of a particular message including information about when, based on the model time reference, the particular message is delivered to the hardware model of the circuit design, wherein the sending comprises sending the arrival time information along with the messages and the dispatch information to the traffic analysis device. The associating arrival time information with messages may comprise: inserting the arrival time information of each of the messages in a metadata field of or a data field of the each of the messages or in special messages.

The method may still further comprise: determining, by the message analysis device, bandwidth information of ports of the circuit design based on the dispatch time information and latency information based on the arrival time information and the dispatch time information.

The hardware model of the interface circuitry may be configured to both convert the messages from signal-level messages to transaction-level messages before sending the messages to the traffic analysis device and convert the messages from transaction-level messages to signal-level messages before delivering the messages to the hardware model of the circuit design.

The reconfigurable hardware modeling device may be a hardware-based emulator or an FPGA-based prototyping device. The traffic generation device may be implemented at least in part by a network traffic tool, wherein the network traffic tool is implemented by a virtual machine running on a computer. The circuit design may be a design for a network switch, a router, a network processor, or a network gateway.

In another aspect, there are one or more non-transitory computer-readable media storing computer-executable instructions for causing one or more processors to generate bitstreams for programming a reconfigurable hardware modeling device to implement circuitry hardware models, the circuitry hardware models comprising: a hardware model of a circuit design, and a hardware model of interface circuitry configurable to associate dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design.

In still another aspect, there is reconfigurable hardware modeling device programmed to implement circuitry hardware models, the circuitry hardware models comprising: a hardware model of a circuit design, and a hardware model of interface circuitry configurable to associate dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design.

The hardware model of the interface circuitry may be configurable to further associate arrival time information with the messages when the messages are delivered to the hardware model of the circuit design, the arrival time information of a particular message including information about when, based on the model time reference, the particular message is delivered to the hardware model of the circuit design, wherein the messages, the arrival time information and the dispatch information are sent to a traffic analysis device. The traffic analysis device may determine bandwidth information of ports of the circuit design based on the dispatch time information and determine latency information based on the arrival time information and the dispatch time information.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Figure 1A:
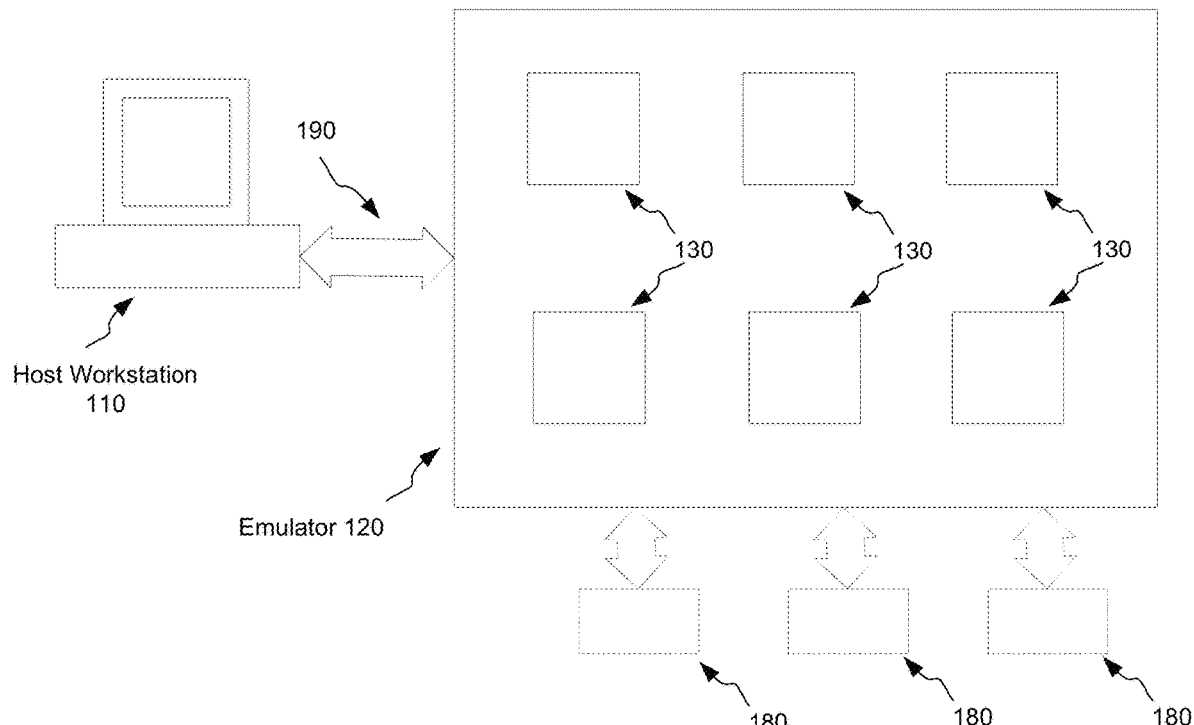
FIG. 1A shows an illustrative example of an emulation system with an emulator being coupled to targets.

Various aspects of the present disclosed technology relate to techniques of bandwidth test in networking system-on-chip design verification. In the following description, numerous details are set forth for the purpose of explanation.

However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "associate", "send" and "deliver" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Hardware Modeling Environment

Reconfigurable hardware modeling devices can be emulators or prototyping devices. Two types of emulators have been developed. The first type is FPGA-based. In an FPGA-based architecture, each FPGA chip has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route are performed on the FPGA chips in a way that preserves the connectivity in the original circuit design.

The programmable logic chips employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that assumes 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modelled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench and the design-under-test, speeding up the execution of the testbench. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

In some embodiments, the disclosed technology may be implemented as part of a hardware emulation environment, such as the one illustrated in FIG. 1A. As seen in this figure, the hardware emulation environment includes an emulator 120 coupled to a host computer or workstation 110. The workstation 110 may be implemented by one or more computing systems. One computing system may include a single computer or multiple computers (e.g., a master computer and a plurality of slave computers). The workstation provides the capability to load the DUV (design-under-verification, also referred to as DUT—design under test) model into the emulator, controls the execution of the DUT model on the emulator over time, and serves as a debugging interface into the DUV model on the emulator. As discussed previously, the workstation may include the testbench and perhaps other software models in some of the operational modes.

The emulator 120 includes multiple printed circuit boards (emulation circuit boards) 130. These emulation circuit boards 130 are networked (not shown). A circuit design may be partitioned by the workstation 110 and loaded to the emulation circuit boards 130 for emulation.

In the in-circuit emulation mode, one or more targets 180 may be coupled to the emulator 120 as shown in FIG. 1A. In some simple environments, a target may be a piece of test equipment that generates and verifies test data such as a network tester. In other environments, the target can be the actual circuitry with which the DUT model will interact in its final application (e.g., other hardware components of the system for which the DUT model is designed). A target can be either a static target or a dynamic target, depending on whether design clock signals run in the emulator can be suspended or not.

Figure 1B:
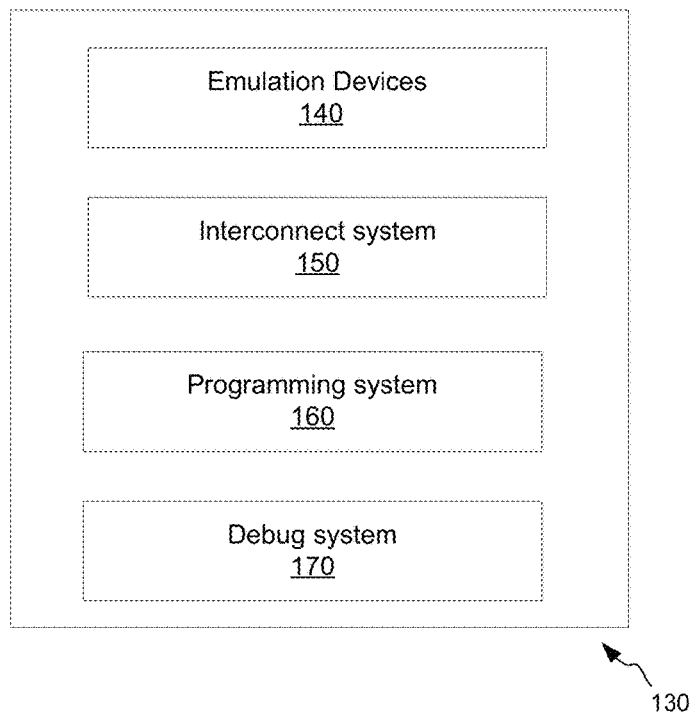
FIG. 1B shows an illustrative example of an emulation circuit board.

FIG. 1B illustrates an example of an emulation circuit board 130. The emulation circuit board 130 includes an array of emulation devices 140. The emulation devices 140 can be programmed to model, for example, combinatorial logic components, sequential circuit components and memories. The emulation devices 140 may be processor-based or FPGA-based.

Also included in the emulation circuit board 130 are a configurable interconnect system 150, a programming system 160, and a debug system 170. A portion of a circuit design on one emulation device may need data computed by another portion of the design on another emulation device. The configurable interconnect system 150 allows data to be moved between emulation devices 140. In some implementations, the configurable interconnect system 150 may include a cross-bar device, a multiplexer, some other configurable network, or any combination thereof.

The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140.

The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model (e.g., FPGA configuration bitstreams), initial contents of registers and design memories and data for debugging purposes. This interface is independent of design-under-test and may comprise dedicated logic or programmed logic in the emulator.

The interface system may also comprise one or more transaction-level interfaces. These interfaces may be optimized for small packets of data and fast streaming speed. The speed may be, for example, in the order of 2-3 Gigabits per second. The communication is performed through transactors as discussed previously. A transactor includes a back-end bus-functional model—instrumented logic in the emulator model, which requires the emulator infrastructure clock keep running even though the design clocks can be stopped.

It should also be appreciated that the emulation system in FIG. 1A and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures.

Figure 2:
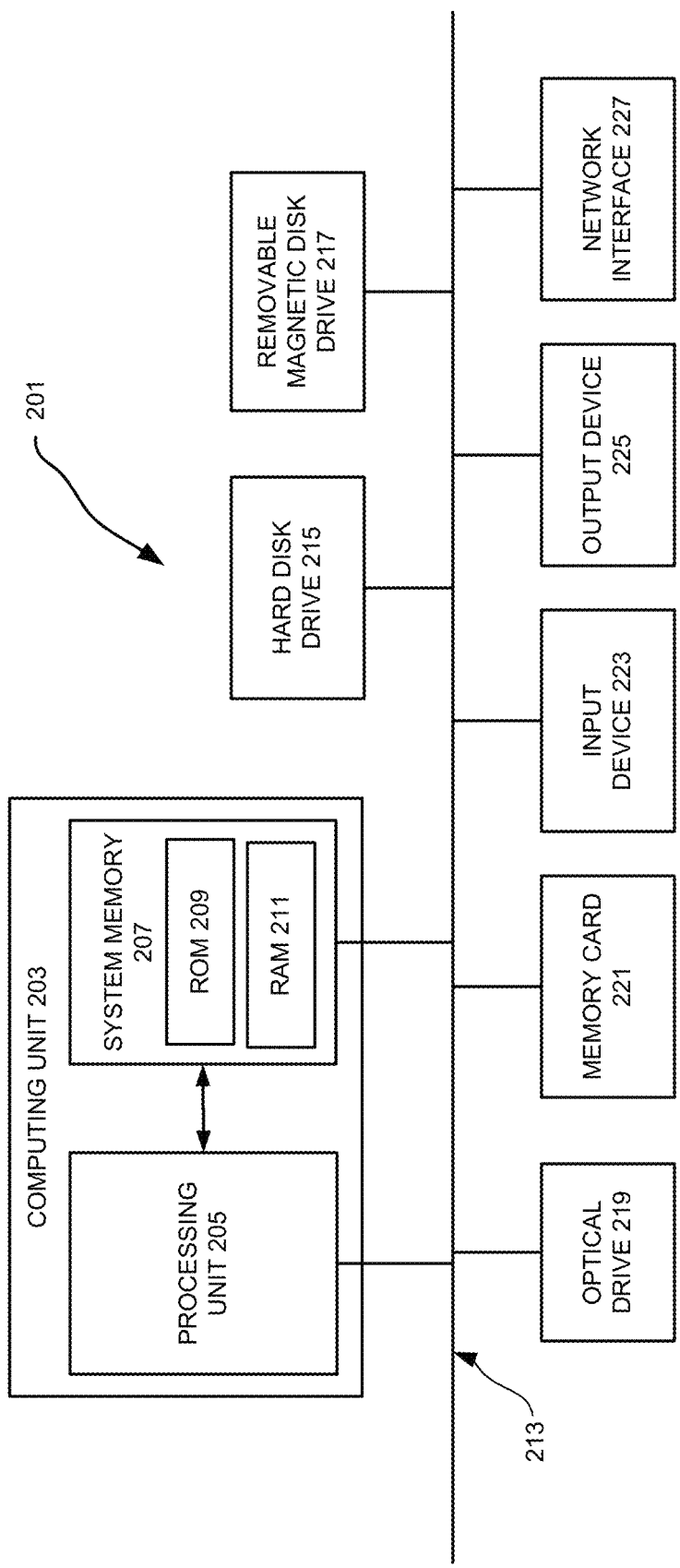
FIG. 2 illustrates a programmable computer system with which various embodiments of the disclosed technology may be employed.

FIG. 2 shows an illustrative example of a computing device 201 that may serve as the workstation 110. As seen in this figure, the computing device 201 includes a computing unit 203 with a processing unit 205 and a system memory 207. The processing unit 205 may be any type of programmable electronic device for executing software instructions, but will conventionally be a microprocessor. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure, to one or more peripheral devices. For example, the processing unit 205 or the system memory 207 may be directly or indirectly connected to one or more additional memory storage devices, such as a "hard" magnetic disk drive 215, a removable magnetic disk drive 217, an optical disk drive 219, or a flash memory card 221. The processing unit 205 and the system memory 207 also may be directly or indirectly connected to one or more input devices 223 and one or more output devices 225. The input devices 223 may include, for example, a keyboard, a pointing device (such as a mouse, touchpad, stylus, trackball, or joystick), a scanner, a camera, and a microphone. The output devices 225 may include, for example, a monitor display, a printer and speakers. With various examples of the computer 201, one or more of the peripheral devices 215-225 may be internally housed with the computing unit 203. Alternately, one or more of the peripheral devices 215-225 may be external to the housing for the computing unit 103 and connected to the bus 213 through, for example, a Universal Serial Bus (USB) connection.

With some implementations, the computing unit 203 may be directly or indirectly connected to one or more network interfaces 227 for communicating with other devices making up a network. The network interface 227 translates data and control signals from the computing unit 203 into network messages according to one or more communication protocols, such as the transmission control protocol (TCP) and the Internet protocol (IP). Also, the interface 227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 201 is illustrated as an example only, and it not intended to be limiting. Various embodiments of the disclosed technology may be implemented using one or more computing devices that include the components of the computer 201 illustrated in FIG. 2, which include only a subset of the components illustrated in FIG. 2, or which include an alternate combination of components, including components that are not shown in FIG. 2. For example, various embodiments of the disclosed technology may be implemented using a multi-processor computer, a plurality of single and/or multiprocessor computers arranged into a network, or some combination of both.

Illustrative Networking Design Verification Environment

Figure 3:
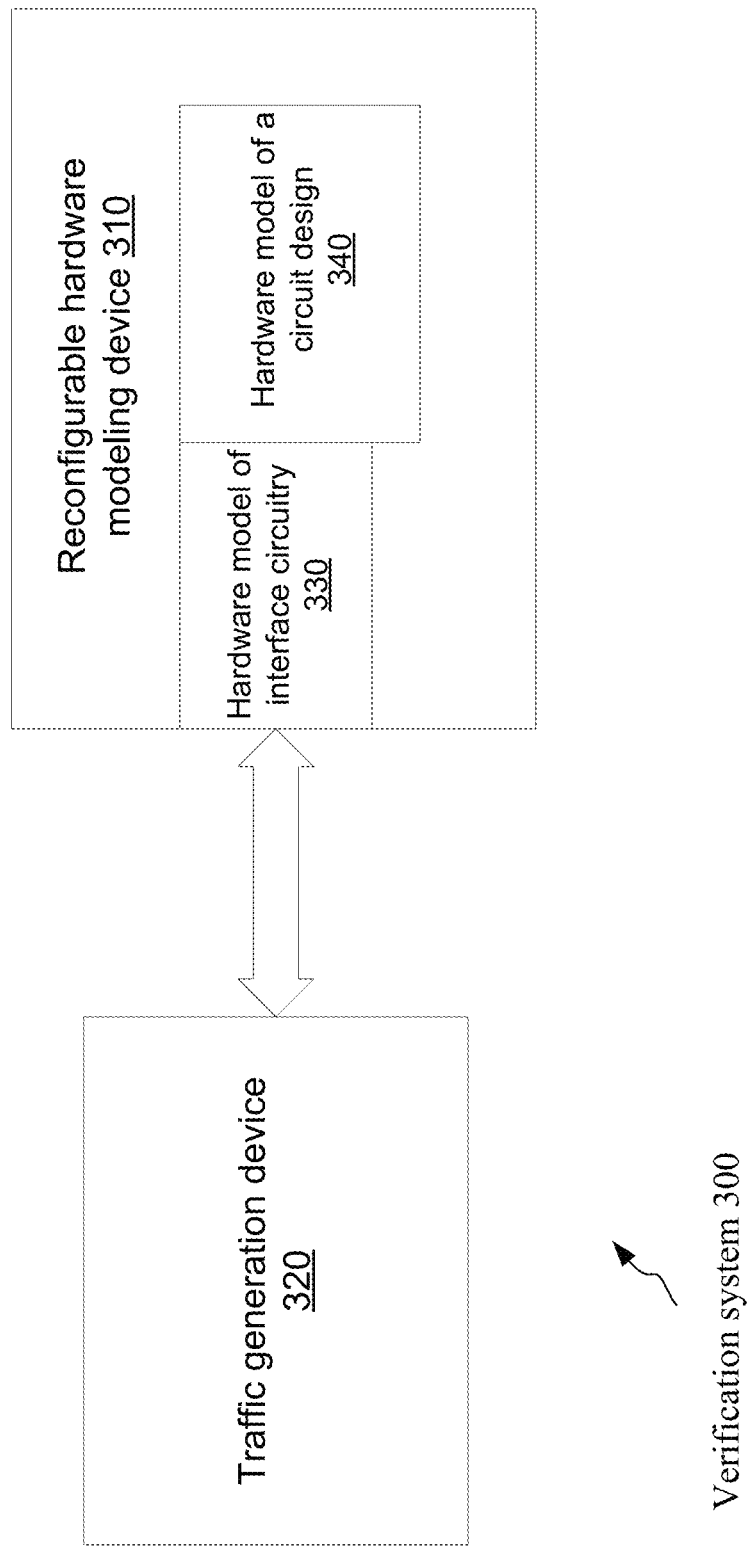
FIG. 3 illustrates an example of a verification system for verifying networking system-on-chip that may be employed by various embodiments of the disclosed technology.

FIG. 3 illustrates an example of a verification system 300 for verifying networking system-on-chip that may be employed by various embodiments of the disclosed technology. The system comprises a reconfigurable hardware modeling device 310 and a traffic generation device 320. The reconfigurable hardware modeling device 310 may be an emulator or an FPGA-based prototyping device. The emulator may be implemented by the emulator shown in FIG. 1A or 1B. The reconfigurable hardware modeling device 310 is programmed to implement circuitry hardware models, which comprises: a hardware model of a circuit design 340 and a hardware model of interface circuitry 330. The circuit design is a networking circuit design such as a design for a network switch, a router, a network processor, or a network gateway. Like a typical networking circuit design, the circuit design may have one or more ports. The verification system 300 can be used for developing and verifying the circuit design, software associated with the circuit design or both.

The hardware model of interface circuitry 330 can convert ingress transaction-level messages to ingress signal-level messages for the hardware model of the circuit design 340 and converts egress signal-level messages dispatched from the hardware model of the circuit design 340 to egress transaction-level messages. The transmitting of the ingress signal-level messages and the egress signal-level messages by the hardware model of the circuit design conforms to a communication protocol. The hardware model of interface circuitry 330 may comprise a back-end bus-functional model and a conditioner. The back-end bus-functional model is part of a transactor while the conditioner is specific to needs of the communication protocol.

The traffic generation device 320 is configured to generate and send the ingress transaction-level messages and to receive and analyze the egress transaction-level messages. The reconfigurable hardware modeling device 310 and the traffic generation device 320 employ a backpressure flow control independent of the communication protocol. The backpressure flow control can cause the traffic generation device to suspend sending messages when one or more message buffers in the traffic generation device, the reconfigurable hardware modeling device, or both cannot accept more messages based on predetermined conditions.

The traffic generation device 320 may be implemented by a network traffic tool installed in a computer system. The software-based tool and the synthesizable hardware models operating in the transaction-based acceleration mode can eliminate some hardware devices otherwise required and, with that, hardware dependencies, including noise, power, cables, reliability and associated costs. The virtual test environment may support multi-users and multi projects, be accessed remotely and deployed in datacenters.

Figure 4:
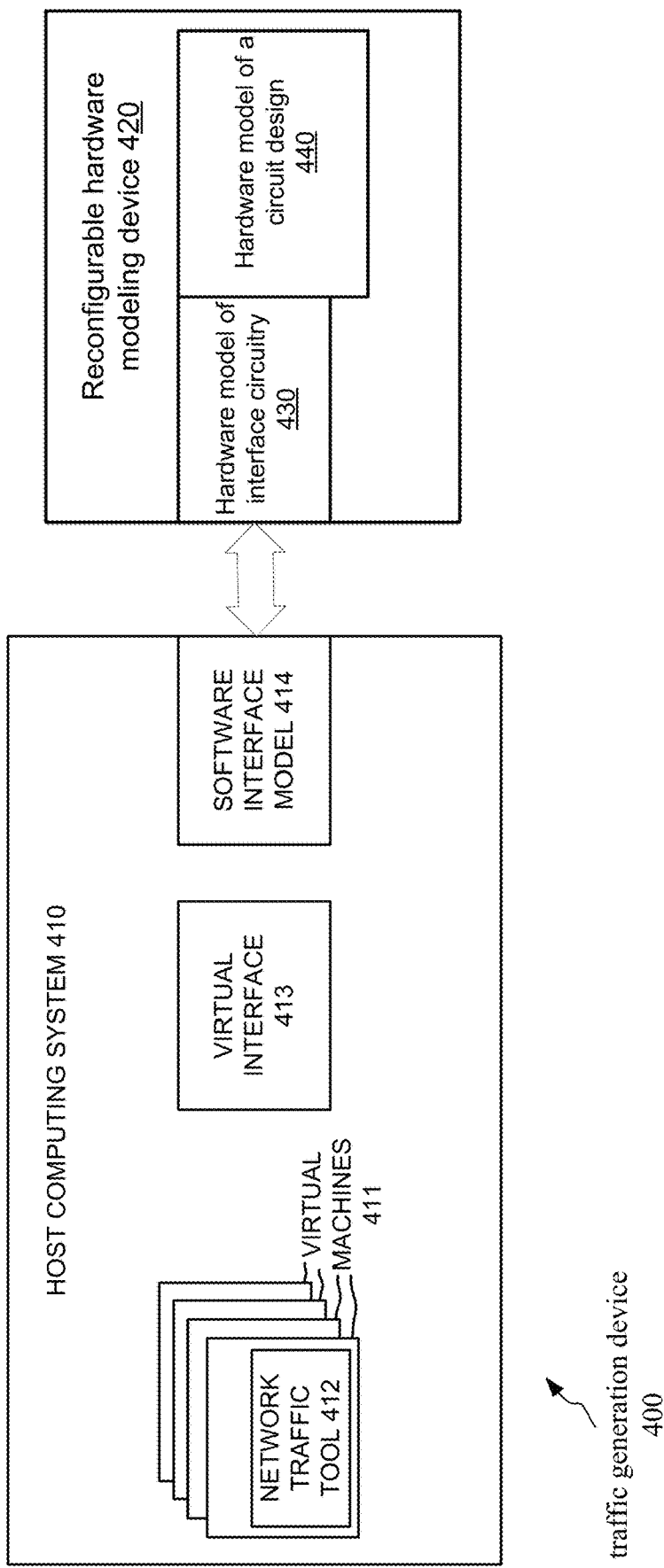
FIG. 4 illustrates an example of a traffic generation device implemented by a network traffic tool installed in a host computer system.

FIG. 4 illustrates an example of a traffic generation device implemented by a network traffic tool 412 installed in a host computer system 410. The host computing system 410 may include one or more computers, workstations, or the like. FIG. 2 shows an example of a computer capable of implementing the host computing system 410.

The host computing system 410 executes one or more virtual machines 411, which can create a virtual environment having virtual electronic hardware and run software on the virtual electronic hardware. The host computing system 410 also includes a hypervisor (not shown in the figure) to configure and control the virtual machines 411 in the host computing system 410. In some embodiments, the virtual machines 411 can include virtual electronic hardware that mimics the hardware architecture of the host computing system 410, for example, allowing the host computing system 410 to run multiple operating systems. The virtual machines 411 may also virtualize hardware architectures that differ from the architecture of the host computing system 410, such as hardware architecture for different computing system, networking device, or the like.

At least one of the virtual machines 411, in some embodiments, implements a network traffic tool 412 to generate one or more of the data packets for testing the circuit design.

The network traffic tool 412 can also receive one or more of the data packets. In some embodiments, the virtual machines 411 implementing the network traffic tool 412 can be implemented in a kernel space or a user space to virtualize hardware architecture of a networking device or the like and run software or other machine-executable instructions to implement the network traffic tool 412. The network traffic tool 412 may generate reports indicating, for example, how the circuit design responded to the data packets generated by the network traffic tool 412, abided by one or more communication protocols, or the like.

Although FIG. 4 shows a single network traffic tool 412 implemented in one of the virtual machines 411, in some embodiments, multiple instances of the network traffic tool 412 can be implemented in a common virtual machine, in different virtual machines, or the like. In some embodiments, a plurality of the virtual machines 411 may each include multiple instances of the network traffic tool 412. Each of the instances of the network traffic tool 412 may generate data packets for one of the ports of the circuit design under test.

The virtual machines 411 can exchange data packets with a host program running on the host computing system 410 through a virtual interface 413. The host program can exchange data packets with a hardware model of a circuit design 440 implemented on a reconfigurable hardware modeling device 420 through a software interface model 414 and a hardware model interface circuitry 430. Sometimes the software interface model 414 and the hardware model interface circuitry 430 together or only the latter is referred to as transactor.

Bandwidth with Respect to Model Time

A reconfigurable hardware modeling device provides a modeled time reference (model time). A time difference between two events of interest in the model execution can be derived with respect to the model time. This time difference represents a direct measure of the real time (wall-clock time) that may elapse in a real life implementation of the circuit for the same two events, within some pre-specified precision. This pre-specified precision can be thought of as the smallest time amount that can be tolerated between the wall-clock time difference and the modeled time difference. Note that for any given (arbitrarily small) desired precision value, the hardware modeling device usually can be configured to provide that precision. The model time advance often has no direct correlation to the wall-clock or real time advance while the model is executing.

The implementation and representation of the modeled time or model time may vary. A possible implementation may involve building a multi-bit (say 64 bits) register in the hardware modeling device infrastructure which maintains the absolute value of the current model time. This register keeps getting updated with appropriate time increments as the hardware modeling device executes the model. For example, if a clock has a specific period, then the time register is increased by a value of this period upon each successive clock edge occurrence. In this case the smallest allowed time increment is the precision of the model time.

Figure 5A:
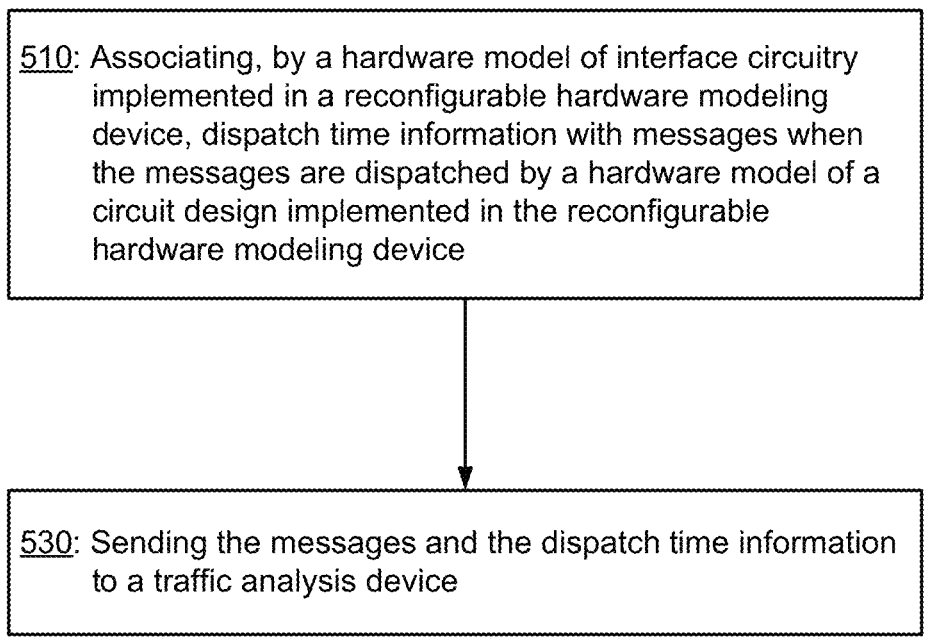
FIG. 5A illustrates an example of a flowchart 500 showing a process for bandwidth test in networking design verification that may be implemented according to various examples of the disclosed technology.
Figure 5A:
Figure 5B:
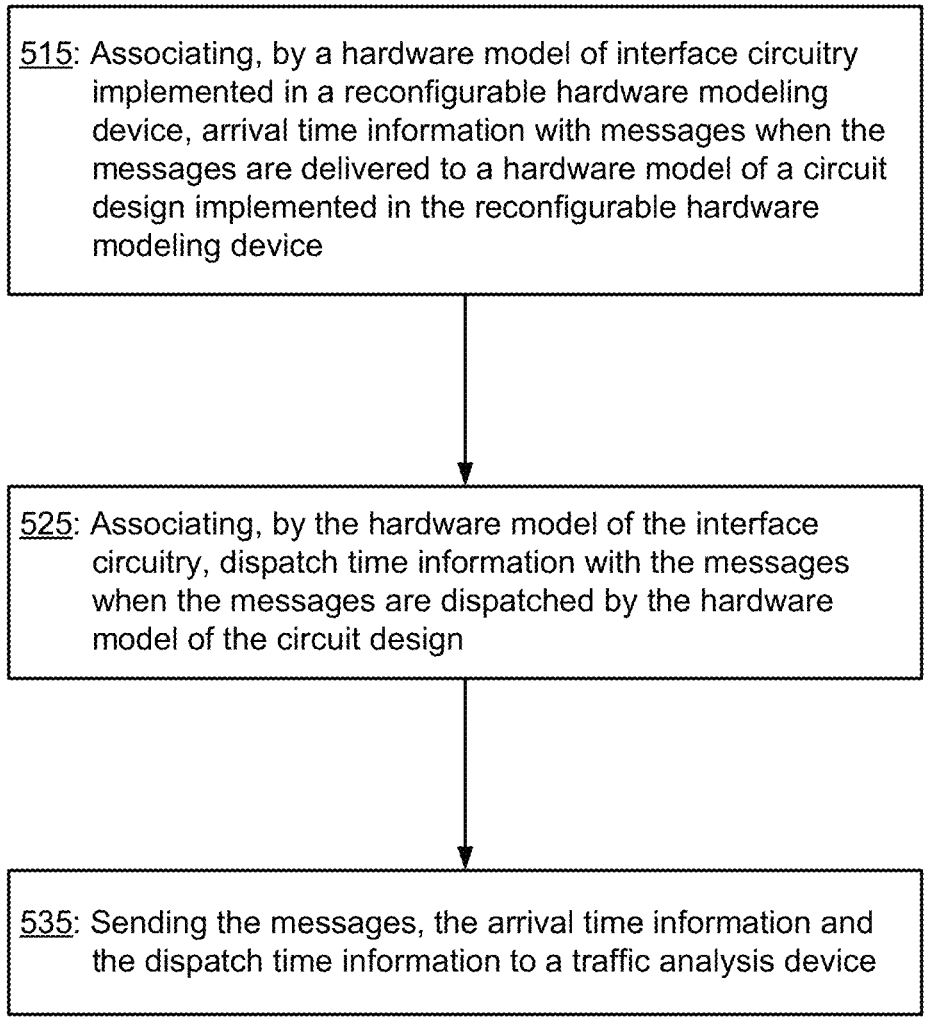
FIG. 5B illustrates an example of a flowchart 505 showing a process for bandwidth test in networking design verification that may be implemented according to various examples of the disclosed technology.
Figure 5B:

FIG. 5A illustrates an example of a flowchart 500 showing a process for bandwidth test in networking design verification that may be implemented according to various examples of the disclosed technology. FIG. 5B illustrates another example of a flowchart 505 showing a process for bandwidth test in networking design verification that may be implemented according to various examples of the disclosed technology. For ease of understanding, methods of bandwidth analysis in networking design verification that may be employed according to various embodiments of the disclosed technology will be described with reference to the verification system 300 illustrated in FIG. 3 and the one illustrated in FIG. 4 and the flow chart 500 illustrated in FIG. 5A and the flow chart 505 illustrated in FIG. 5B. It should be appreciated, however, that alternate implementations of a verification system may be used to perform the method of bandwidth test in networking design verification in the flow chart 500 or in the flow chart 505 according to various embodiments of the disclosed technology. In addition, it should be appreciated that implementations of the verification system 300 may be employed to implement methods of bandwidth test in networking design verification according to different embodiments of the disclosed technology other than the one illustrated by the flow chart 500 in FIG. 5A or illustrated by the flow chart 505 in FIG. 5B.

In operation 510 of the flow chart 500, the hardware model of interface circuitry 330 associates dispatch time information with messages when the messages are dispatched by the hardware model of the circuit design 340. The dispatch time information of a particular message includes information about when, based on a model time reference provided in the reconfigurable hardware modeling device 310, the particular message is dispatched by the hardware model of the circuit design 340. The messages may be generated initially by the traffic generation device 320. The traffic generation device 320 may be implemented at least in part by a network traffic tool which is implemented by a virtual machine running on a computer. One example of such as a traffic generation device is illustrated in FIG. 4. The circuit design may be a design for a network switch, a router, a network processor, or a network gateway.

Figure 6:
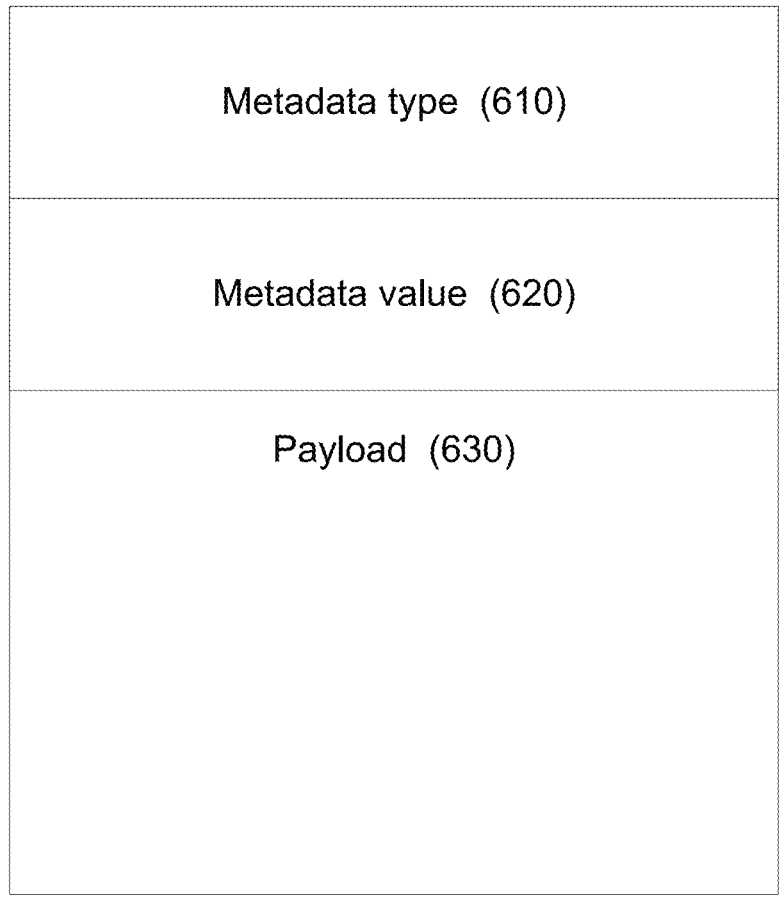
FIG. 6 illustrates an example of a message datagram.

The dispatch time information of each of the messages may be inserted in either a metadata field of or a data field of each of the messages. FIG. 6 illustrates an example of a message datagram. The metadata field includes metadata type 610 and metadata value 620. The data field is shown as payload 630. For an error-control protocol such as Transmission Control Protocol (TCP), the checksum/signature embedded in a message may need to be recalculated if the dispatch time information is inserted in the data field. Alternatively, special messages may be used to carry the dispatch time information.

A message can be a series of data bytes consumed over multiple clock cycles at the port of the hardware model of the circuit design 340. The point of exit may be treated as the point of exit of the first set of bytes or the last set of bytes for that same message.

In operation 530 of the flow chart 500, the hardware model of interface circuitry 330 sends the messages and the dispatch time information to a traffic analysis device. The dispatch time information can be used to derive bandwidth information. The traffic generation device 320 may be configured to analyze the messages received. Alternatively, the traffic analysis device may be a device separated from or in addition to the traffic generation device 320.

In operation 515 of the flow chart 505, the hardware model of interface circuitry 330 associates arrival time information with messages when the messages are delivered to the hardware model of the circuit design 340. The arrival time information of a particular message includes information about when, based on a model time reference provided in the reconfigurable hardware modeling device 310, the particular message is delivered to the hardware model of the circuit design 340. The arrival time information of each of the messages may be inserted in either a metadata field of or a data field of each of the messages. Alternatively, special messages may be used to carry the arrival time information. A message can be a series of data bytes consumed over multiple clock cycles at the port of the hardware model of the circuit design 340. The point of entry of a message may be treated as the point of entry of the first set of bytes or the last set of bytes for the message.

In operation 525 of the flow chart 505, the hardware model of interface circuitry 330 associates dispatch time information with the messages when the messages are dispatched by the hardware model of the circuit design 340. The model time reference provides current model time which can be treated as the dispatch time. The point of exit of a message may be treated as the point of exit of the first set of bytes or the last set of bytes for the message. The dispatch time information of each of the messages may be inserted in the same location where the arrival time information is inserted such as the metadata field of or the data field of each of the messages, or may use the special messages to carry the arrival time information.

In operation 535 of the flow chart 505, the messages, the arrival time information and the dispatch time information are sent to the traffic analysis device. Based on the arrival time information and the dispatch time information, the traffic analysis device can derive latency information. For example, the difference between the dispatch time and the arrival time can be treated as the latency. The dispatch time information can be used to derive bandwidth information.

With various implementations of the disclosed technology, the hardware model of interface circuitry 330 is also configured to convert the messages from signal-level messages to transaction-level messages before sending the messages to the traffic analysis device and from transaction-level messages to signal-level messages before delivering the messages to the hardware model of the circuit design 340.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, comprising:
   associating, by a hardware model of interface circuitry implemented in a reconfigurable hardware modeling device, dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design;
   associating, by the hardware model of the interface circuitry, arrival time information with the messages when the messages are delivered to the hardware model of the circuit design, the arrival time information of a particular message including information about when, based on the model time reference, the particular message is delivered to the hardware model of the circuit design; and
   sending the messages and the dispatch time information to a traffic analysis device, wherein the sending comprises sending the arrival time information along with the messages and the dispatch information to the traffic analysis device.

2. The method recited in claim 1, wherein the associating the dispatch time information comprises:
   inserting the dispatch time information of each of the messages in a metadata field of or a data field of the each of the messages or in special messages.

3. The method recited in claim 1, further comprising:
   determining, by the message analysis device, bandwidth information of ports of the circuit design based on the dispatch time information and latency information based on the arrival time information and the dispatch time information.

4. The method recited in claim 1, wherein the associating arrival time information with the messages comprises:
   inserting the arrival time information of each of the messages in a metadata field of or a data field of the each of the messages or in special messages.

5. The method recited in claim 1, wherein the hardware model of the interface circuitry converts the messages from transaction-level messages to signal-level messages before delivering the messages to the hardware model of the circuit design and converts the messages from signal-level messages to transaction-level messages before sending the messages to the traffic analysis device.

6. The method recited in claim 1, wherein the reconfigurable hardware modeling device is a hardware-based emulator or an FPGA-based prototyping device.

7. The method recited in claim 1, wherein the circuit design is a design for a network switch, a router, a network processor, or a network gateway.

8. The method recited in claim 1, wherein the traffic analysis device is implemented at least in part by a network traffic tool, the network traffic tool being implemented by a virtual machine running on a computer.

9. The method recited in claim 1, wherein the model time reference is provided at least in part by a multi-bit register in the reconfigurable hardware modeling device.

10. One or more non-transitory computer-readable media storing computer-executable instructions for causing one or more processors to generate bitstreams for programming a reconfigurable hardware modeling device to implement circuitry hardware models, the circuitry hardware models comprising:
    a hardware model of a circuit design, and
    a hardware model of interface circuitry configurable to:
       associate dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design; and associate arrival time information with the messages when the messages are delivered to the hardware model of the circuit design, the arrival time information of a particular message including information about when, based on the model time reference, the particular message is delivered to the hardware model of the circuit design, wherein the messages, the arrival time information and the dispatch information are sent to a traffic analysis device.

11. The one or more non-transitory computer-readable media recited in claim 10, wherein the association of the dispatch time information with the messages comprises:
inserting the dispatch time information of each of the messages in a metadata field of or a data field of the each of the messages or in special messages.

12. The one or more non-transitory computer-readable media recited in claim 10, wherein the traffic analysis device determines bandwidth information of ports of the circuit design based on the dispatch time information and determines latency information based on the arrival time information and the dispatch time information.

13. The one or more non-transitory computer-readable media recited in claim 10, wherein the association of the arrival time information with the messages comprises:
inserting the arrival time information of each of the messages in a metadata field of or a data field of the each of the messages or in special messages.

14. The one or more non-transitory computer-readable media recited in claim 10, wherein the hardware model of the interface circuitry converts the messages from transaction-level messages to signal-level messages before delivering the messages to the hardware model of the circuit design and converts the messages from signal-level messages to transaction-level messages before sending the messages to the traffic analysis device.

15. The one or more non-transitory computer-readable media recited in claim 10, wherein the reconfigurable hardware modeling device is a hardware-based emulator or an FPGA-based prototyping device.

16. The one or more non-transitory computer-readable media recited in claim 10, wherein the circuit design is a design for a network switch, a router, a network processor, or a network gateway.

17. The one or more non-transitory computer-readable media recited in claim 10, wherein the traffic analysis device is implemented at least in part by a network traffic tool, the network traffic tool being implemented by a virtual machine running on a computer.

18. The one or more non-transitory computer-readable media recited in claim 10, wherein the model time reference is provided at least in part by a multi-bit register in the reconfigurable hardware modeling device.

19. A reconfigurable hardware modeling device programmed to implement circuitry hardware models, the circuitry hardware models comprising:
a hardware model of a circuit design, and
a hardware model of interface circuitry configurable to:
associate dispatch time information with messages when the messages are dispatched by a hardware model of a circuit design implemented in the reconfigurable hardware modeling device, the dispatch time information of a particular message including information about when, based on a model time reference provided in the reconfigurable hardware modeling device, the particular message is dispatched by the hardware model of the circuit design; and associate arrival time information with the messages when the messages are delivered to the hardware model of the circuit design, the arrival time information of a particular message including information about when, based on the model time reference, the particular message is delivered to the hardware model of the circuit design, wherein the messages, the arrival time information and the dispatch information are sent to a traffic analysis device.

20. The reconfigurable hardware modeling device recited in claim 19, wherein the association of the dispatch time information with the messages comprises:
inserting the dispatch time information of each of the messages in a metadata field of or a data field of the each of the messages or in special messages.

21. The reconfigurable hardware modeling device recited in claim 19, wherein the traffic analysis device determines bandwidth information of ports of the circuit design based on the dispatch time information and determines latency information based on the arrival time information and the dispatch time information.

22. The reconfigurable hardware modeling device recited in claim 19, wherein the association of the arrival time information with the messages comprises:
inserting the arrival time information of each of the messages in a metadata field of or a data field of the each of the messages or in special messages.

23. The reconfigurable hardware modeling device recited in claim 19, wherein the hardware model of the interface circuitry converts the messages from transaction-level messages to signal-level messages before delivering the messages to the hardware model of the circuit design and converts the messages from signal-level messages to transaction-level messages before sending the messages to the traffic analysis device.

24. The reconfigurable hardware modeling device recited in claim 19, wherein the reconfigurable hardware modeling device is a hardware-based emulator or an FPGA-based prototyping device.

25. The reconfigurable hardware modeling device recited in claim 19, wherein the circuit design is a design for a network switch, a router, a network processor, or a network gateway.

26. The reconfigurable hardware modeling device recited in claim 19, wherein the traffic analysis device is implemented at least in part by a network traffic tool, the network traffic tool being implemented by a virtual machine running on a computer.

27. The reconfigurable hardware modeling device recited in claim 19, wherein the model time reference is provided at least in part by a multi-bit register in the reconfigurable hardware modeling device.

* * * * *